United States Patent
Sakurai (10) Patent No.: US 6,435,855 B1
(45) Date of Patent: Aug. 20, 2002

(54) RESIN-MOLDING MOLD UNIT AND RESIN-MOLDING APPARATUS PROVIDED WITH THE RESIN-MOLDING MOLD UNIT

(75) Inventor: Hiroshi Sakurai, Kumamoto (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 09/580,699

(22) Filed: May 30, 2000

(30) Foreign Application Priority Data

May 28, 1999 (JP) ............................................ 11-150664

(51) Int. Cl.$^7$ .............................................. B29C 45/40
(52) U.S. Cl. ....................... 425/139; 264/334; 425/444; 425/556
(58) Field of Search ............................... 425/116, 556, 425/444, 139; 264/334, 336

(56) References Cited

U.S. PATENT DOCUMENTS 5,759,116 A * 6/1998 Kasasima et al. .............. 425/90
5,975,869 A * 11/1999 Shimosaka et al. .......... 425/116

FOREIGN PATENT DOCUMENTS

JP 6-243641 9/1994
JP 8-66737 3/1996

* cited by examiner

Primary Examiner—Tim Heitbrink
(74) Attorney, Agent, or Firm—Hutchins, Wheeler & Dittmar

(57) ABSTRACT

A resin-molding mold unit and a resin-molding apparatus having the resin-molding mold unit are capable of removing any air trap from a molten resin therein. This makes it possible to produce a molded product which is free from any void and therefore improved in appearance. In order to enhance demolding of the molded product from the resin-molding mold unit, this resin-molding mold unit has a pin hole in which an ejection pin is received to have its front end portion extend into a molding space from an inner wall surface thereof by a length which is adjustable, if necessary. The front end portion assumes a semispheric shape. In injecting the molten resin, the ejection pin is adjusted in position so as to have its outer peripheral edge portion aligned in level with the inner wall surface. Since the molten resin thus injected flows along the semispheric front end portion, any air trap is not formed in the vicinity of the ejection pin, particularly, in a downstream side thereof.

6 Claims, 8 Drawing Sheets

RESIN-MOLDING MOLD UNIT AND RESIN-MOLDING APPARATUS PROVIDED WITH THE RESIN-MOLDING MOLD UNIT

BACKGROUND OF THE INVENTION

1. Field of the Invention

The present invention relates to a resin-molding mold unit and a resin-molding apparatus provided with the resin-molding mold unit, and more particularly to the resin-molding mold unit and the molding apparatus both adapted to seal a semiconductor chip or like elements by molding of a resin.

2. Description of the Related Art

In a mass-consumption society of modern times, various types of products are mass-produced and mass-consumed. Consequently, an art of molding a resin is one of essential arts for supporting the mass-consumption society. A method for molding the resin has a wide variation. In a brief summary, the method is carried out by injection or potting of a molten resin in a mold. In this case, when an element such as a semiconductor chip or a like is previously disposed in the mold, it is possible to seal the element as a whole or to seal a part of the element by injection or potting of the resin (hereinafter referred to as a molding operation). In this molding operation, after completion of molding the resin, it is often difficult to take a molded product out of the mold. In order to avoid the above difficulty, a parting (demolding) agent is often used, which makes it possible to easily take the molded product out of the mold. Further, a suitable ejection means such as an ejection pin or a like is also used in the mold to serve as a mechanism for forcibly taking the molded product out of the mold after completion of molding the resin.

Figure 7A:
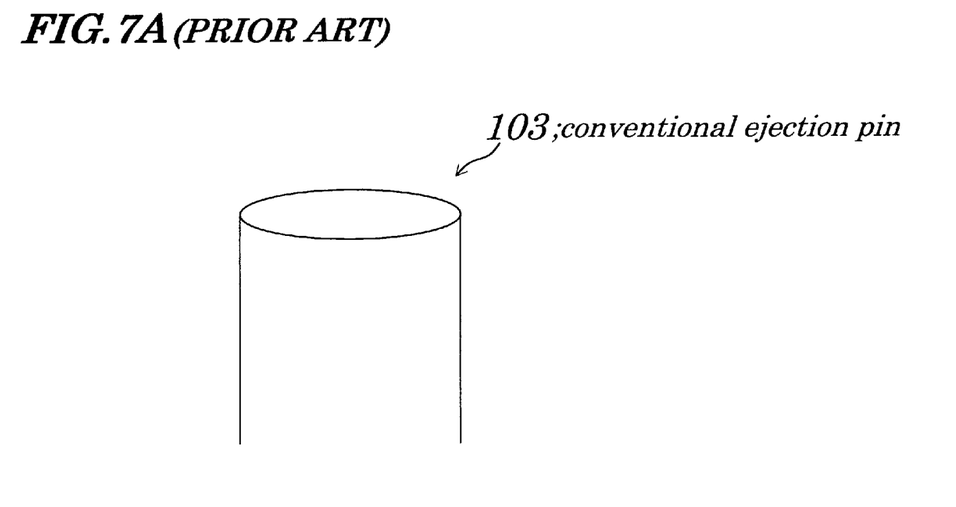
FIG. 7A is a perspective view of a first conventional ejection pin assuming a cylindrical shape with a full-diameter flat top surface.

As shown in FIG. 7A, there is a conventional type of an ejection pin 103 in the art. The ejection pin 103 is movably mounted in a pin hole formed in the mold. In the molding operation, the ejection pin 103 has its front end portion slightly projected into a cavity of the mold by a length of from approximately 0.05 mm to approximately 0.20 mm. When the molded product is taken out of the mold, the ejection pin 103 is pushed into the cavity of the mold to have its front end portion largely extend into the cavity, so that the molded product is forcibly ejected from the mold. In general, as is clear from FIG. 7A, the conventional ejection pin 103 assumes a simple cylindrical shape with a full-diameter flat top surface.

Figure 7B:
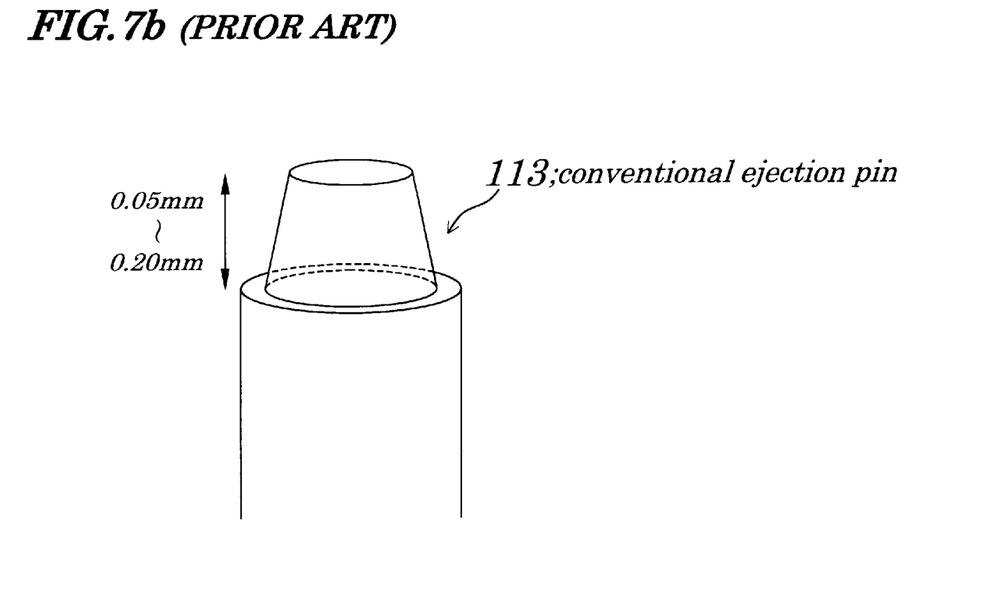
FIG. 7B is a perspective view of a second conventional ejection pin provided with a front end portion assuming a circular truncated cone shape.

As shown in FIG. 7B, there is another conventional type of an ejection pin 113 in the art, for example, as shown in Japanese Patent Application Laid-Open No. Hei 6-243641, wherein, as is clear from FIG. 7B, the other conventional ejection pin 113 has its front end portion formed into a circular truncated cone shape, a bottom diameter of which is smaller than an outer diameter of an intermediate portion of the ejection pin 113 to form a shoulder portion therebetween. In general, the ejection pin 113 is projected into the cavity of the mold by a length slightly longer than the above-mentioned ordinary length of from approximately 0.05 to approximately 0.20 mm applied to the front end portion of the previous ejection pin 103.

Ejection mechanisms such as one for taking the molded product out of the mold using the ejection pin provided in the mold are used not only in the art of resin-molding, but also in arts of metal forging, pressing, and like forming processes. These arts are described in, for example, Japanese Patent Application Laid-Open No. Hei 8-66737 and a like.

However, in a conventional resin-molding apparatus provided with the conventional ejection pins 103 or 113, the ejection pin has its front end portion extended into the cavity of the mold. This affects the molten resin in flow in the molding operation performed in the mold, and produces a void in the molded product. The thus produced void in the molded product impairs the product in appearance and sealing properties.

Figure 8A:
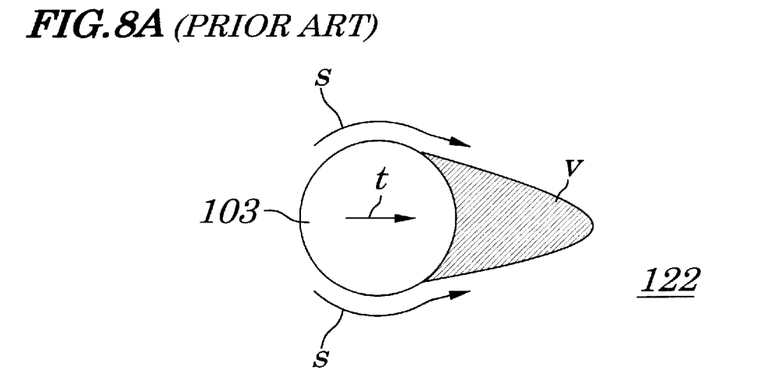
FIG. 8A is a top view of the first conventional ejection pin shown in FIG. 7A, illustrating stream lines of the molten resin in the vicinity of the ejection pin.
Figure 8B:
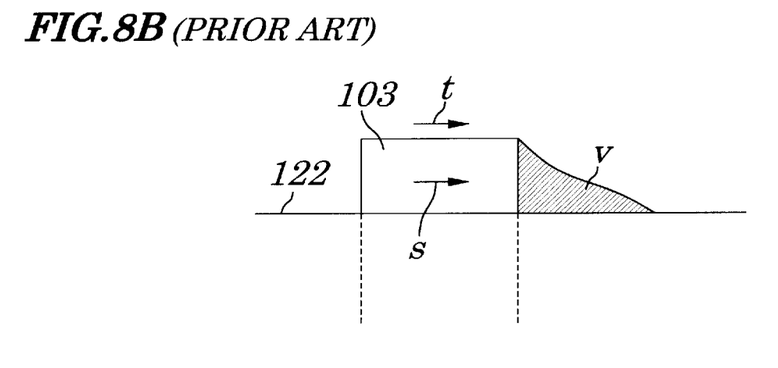
FIG. 8B is a front view of the first conventional ejection pin shown in FIG. 7A, illustrating the stream lines of the molten resin in the vicinity of the ejection pin.

More specifically, as shown in FIG. 8A, in the case of the cylindrical ejection pin 103 provided with the full-diameter flat top surface, a molten resin indicated by a curved arrow "s" joins at an opposite side of the ejection pin 103, and, therefore often forms an air trap "v" in a downstream side of the conventional ejection pin 103. Since the conventional ejection pin 103 has its top surface be smooth and parallel to an inner wall surface of the cavity of the mold, as shown in FIG. 8B, there is no possibility that the air trap "v" is removed by a molten resin "t" flowing over the top surface of the conventional ejection pin 103. As a result, the air trap "v" formed in the molten resin produces the above-mentioned void in the product thus molded.

Figure 9A:
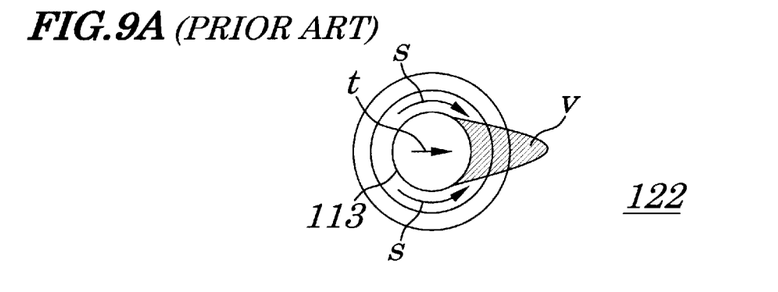
FIG. 9A is a top view of the second conventional ejection pin shown in FIG. 7B, illustrating the stream lines of the molten resin in the vicinity of the ejection pin.
Figure 9B:
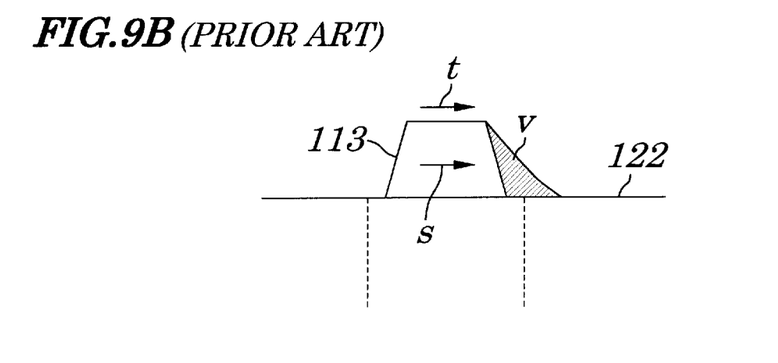
FIG. 9B is a front view of the second conventional ejection pin shown in FIG. 7B, illustrating the stream lines of the molten resin in the vicinity of the ejection pin.

As for the another conventional ejection pin 113 (shown in FIG. 7B) having its front end portion formed into the circular truncated cone shape with a reduced-diameter flat top surface, as is clear from FIGS. 9A and 9B, the air trap "v" is also formed in the downstream side of this conventional ejection pin 113, as is in the case of the previous conventional ejection pin 103. In this connection, since the conventional ejection pin 113 has its front end portion formed into the truncated cone shape smaller in volume than the corresponding front end portion of the previous conventional ejection pin 103, it is expected that the air trap "v" formed in the downstream side of this conventional ejection pin 113 is much smaller in volume than the corresponding air trap "v" formed in the downstream side of the previous conventional ejection pin 103. However, in the molding operation, the truncated cone-shaped front end portion of this conventional ejection pin 113 also serves as a part of the mold, and is therefore extended into the cavity of the mold by a length much longer than that of the corresponding front end portion of the previous conventional ejection pin 103. Consequently, an actual difference in volume between the air trap "v" formed by this conventional ejection pin 113 and the corresponding air trap "v" formed by the previous conventional ejection pin 103 is substantially negligible.

SUMMARY OF THE INVENTION

In view of the above, it is an object of the present invention to provide a resin-molding mold unit and a resin-molding apparatus provided with the mold unit, and more particularly to provide the mold unit and the molding apparatus both adapted to seal a semiconductor chip or like elements by molding of a resin, and thereby producing a molded product excellent in appearance and sealing properties.

According to a first aspect of the present invention, there is provided a resin-molding mold unit including:

a resin-molding mold member provided with a cavity assuming a predetermined shape, wherein said cavity is defined by an inner wall surface of said resin-molding mold member, and said inner wall surface is provided with a hole; and a movable member which is movably mounted in said hole of said resin-molding mold member and has its front end portion formed into a semispheric shape.

In the foregoing, a preferable mode is one wherein said resin-molding mold member is further provided with an injection passage through which a molten resin is injected into said cavity of said resin-molding mold member.

Also, a preferable mode is one wherein said resin-molding mold member is integrally provided with a position control mechanism for controlling in position said movable member in a manner such that said movable member has an outer peripheral edge portion of its semispheric front end portion aligned in level with said inner wall surface which defines said cavity of said resin-molding mold member.

According to a second aspect of the present invention, there is provided a resin-molding apparatus for molding a molten resin into a predetermined shape, including:

- a resin-molding mold unit comprising a first resin-molding mold member and a movable member, wherein said first resin-molding mold member is provided with a first cavity assuming a predetermined shape, wherein said first cavity is defined by an inner wall surface of said first resin-molding mold member, and said inner wall surface is provided with a hole, wherein said movable member is movably mounted in said hole of said first resin-molding mold member and has its front end portion formed into a semispheric shape, wherein said first resin-molding mold member is integrally provided with a position control mechanism for controlling in position said movable member in a manner such that said movable member has an outer peripheral edge portion of its semispheric front end portion aligned in level with said inner wall surface which defines said first cavity of said first resin-molding mold member;
- a second resin-molding mold member provided with a second cavity which cooperates with said first cavity of said first resin-molding mold member to form a molding space into which said molten resin is injected and formed into a molded product; and
- a movable member operating mechanism for operating said movable member in a manner such that: when said molten resin is injected into said molding space, said movable member is held in a position established by said position control mechanism; and, when said molded product is taken out of said molding space, said movable member is pushed forward to extend into said molding space to enhance demolding of said molded product.

In the foregoing second aspect, a preferable mode is one that wherein further including a mold unit operating mechanism for operating at least one of said first and said second resin-molding mold member so as to have said one brought into contact with and spaced apart from the other of said first resin-molding mold member and said second resin-molding mold member.

Also, a preferable mode is one wherein still further including an injection means for injecting said molten resin into said molding space, wherein said molding space is formed by both said first resin-molding mold member and said second resin-molding mold member.

With the above configurations, the mold unit operating mechanism operates at least one of the first and the second mold member, and thereby having their cavities combined with each other to form the molding space into which the molten resin is injected. At this time, the movable member operating mechanism keeps a length of the movable member exposed to the cavity of the mold at a predetermined value, which value has been determined by the position control mechanism to expose the above length of the movable member to the cavity of the mold. In other words, the movable member is controlled by the position control mechanism in a manner such that it has the outer peripheral edge portion of its semispheric front end portion aligned in level with the inner wall surface of the cavity of the mold member. In this condition, the movable member has only its semispheric front end portion projected into the cavity of the mold member. Incidentally, when the position control mechanism is combined with the mold unit to form a mold assembly by making the position control mechanism an integral part of the mold unit, it is possible to replace the mold assembly with a desired one of the mold assemblies without replacing the individual position control mechanism independently of the corresponding mold unit. In this case, it is possible to eliminate a position adjusting operation of the movable member even when the mold assembly is replaced with a desirable one.

In injecting the molten resin, the injection means or unit is actuated to inject the molten resin into the molding space of the mold unit. The thus injected molten resin flows along the front end portion of the movable member, so that the molding space of the mold unit in the vicinity of the front end portion of the movable member is filled with the molten resin.

As described above, the movable member has its front end portion formed into a substantially semispheric shape, and has the outer peripheral edge portion of this front end portion aligned in level with the inner wall surface of the molding space. In other words, the entire semispheric front end portion of the movable member projects into the molding space. Consequently, there is no gap between the inner wall surface of the molding space and the semispheric front end portion of the movable member. In other words, there is no fear that the molten resin flows into such gap to form a fin in the mold unit. Further, since only the semispheric front end portion of the movable member forms a projection in a stream of the molten resin in the molding space, any air trap is not formed in the downstream side of the movable member in the stream. Consequently, in the mold unit, it is possible to fill the molding space (particularly, a space in the vicinity of the front end portion of the movable member) with the molten resin without forming any air trap therein. In demolding the molded product from the mold unit after the molded resin is cured, the movable member operating mechanism is actuated to push the movable member into the molding space to enhance demolding of the molded product.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
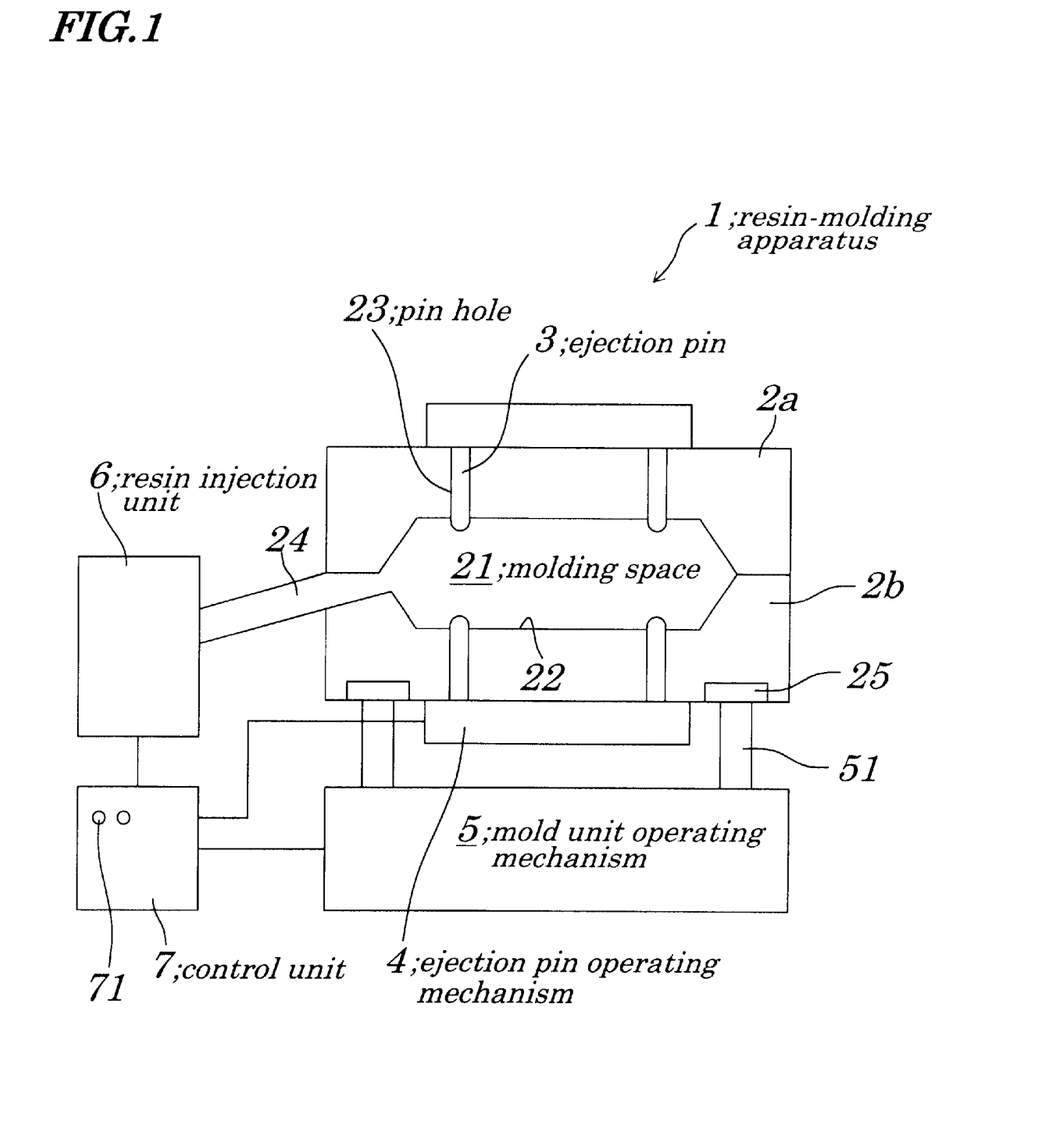
FIG. 1 is a block diagram illustrating a resin-molding apparatus of an embodiment of the present invention.

FIG. 1 shows an embodiment of a resin-molding apparatus 1 of the present invention, wherein the resin-molding apparatus 1 is characterized by an ejection pin 3 having its front end portion formed into a semi spheric shape.

Now, with reference to FIGS. 1, 2, 4A and 4B, the resin-molding apparatus 1 will be described.

As is clear from FIG. 1, the resin-molding apparatus 1 is constructed of: a mold unit 2a, 2b; a plurality of ejection pins 3; an ejection pin operating mechanism 4; a mold unit operating mechanism 5; a resin injection unit 6; and, a control unit 7.

The mold unit 2a, 2b is constructed of an upper mold 2a and a lower mold 2b. The lower mold 2b is oppositely disposed from the upper mold 2a to form a molding space 21 therebetween. The molding space 21 is therefore defined by an inner wall surface of the mold unit 2a, 2b, and assumes substantially a same shape as that of a semiconductor chip or a like which should be sealed by injection of a molten resin. As is clear from FIG. 1, a plurality of through-holes provided in the mold unit 2a, 2b serve as a plurality of pin holes 23. The lower mold 2b is provided with a resin injection opening 24 through which the molten resin is injected into the molding space 21. Furthermore, the upper mold 2a is held stationarily in a molding operation of the molten resin. In contrast with the upper mold 2a, the lower mold 2b is moved by the mold unit operating mechanism 5 in operation in a manner such that the lower mold 2b is brought into contact with or spaced apart from the upper mold 2a.

As viewed in FIG. 1, the lower mold 2b is provided with a connection portion 25 in its bottom portion, and connected with a support arm 51 of the mold unit operating mechanism 5 through the connection portion 25. This connection portion 25 is detachably engaged with the support arm 51 to permit an operator of the resin-molding apparatus 1 to replace the mold unit 2a, 2b with new or different ones, if necessary.

Figure 2:
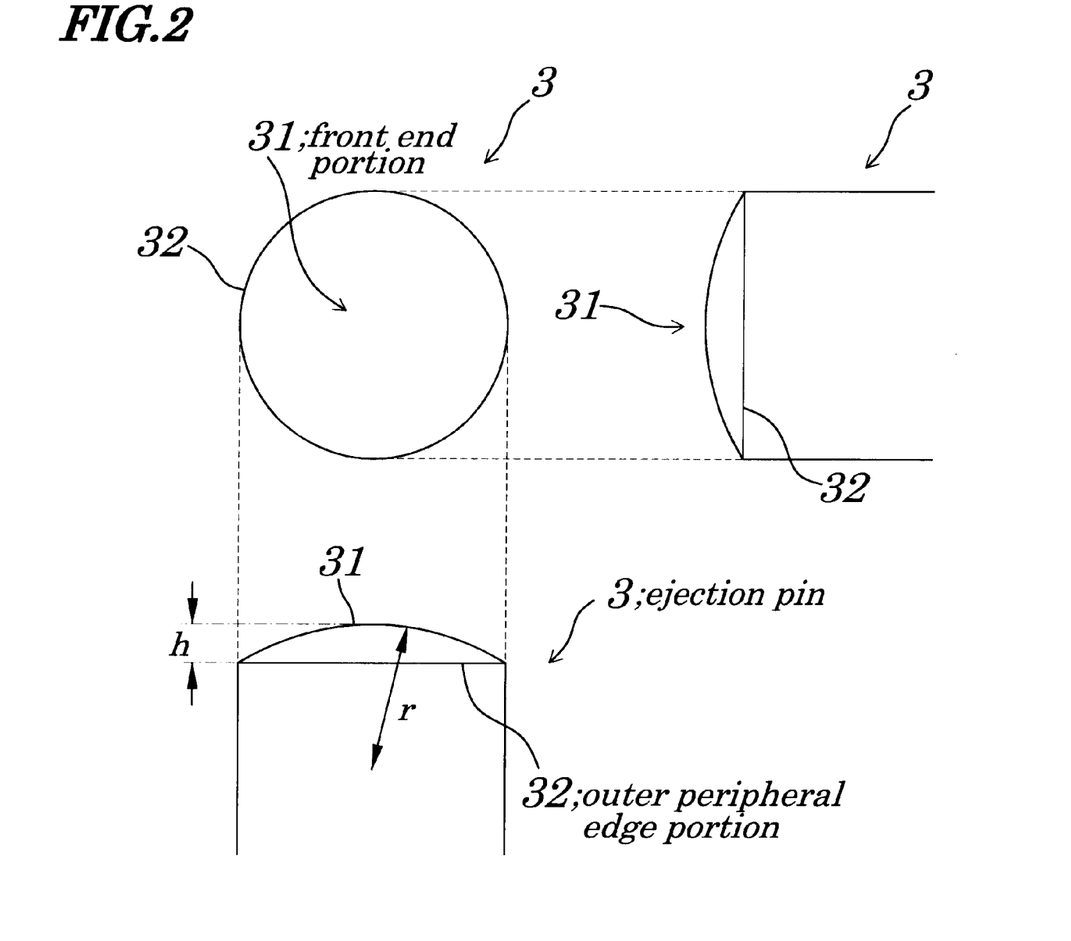
FIG. 2 shows regular views including a top, a right side and a front view of an ejection pin, which is provided with a semispheric front end portion and used in the molding apparatus shown in FIG. 1.

The ejection pin 3 is used to enhance demolding of a molded product "m" from the molding space 21. In this embodiment, as shown in FIG. 2, the ejection pin 3 is a rod-like member having its front end portion 31 formed into a domic (semispheric) shape. As will be described later in detail, the ejection pin 3 is movably mounted in the pin hole 23 in a manner such that it permits the ejection pin operating mechanism 4 to adjust a length of its front end portion 31 extending into the molding space 21. More specifically, when the molten resin is injected into the molding space 21, the above length of the front end portion 31 of the ejection pin 3 is adjusted by the ejection pin operating mechanism 4 in a manner such that an outer peripheral edge portion 32 of the front end portion 31 of the ejection pin 3 is strictly aligned in level with an inner wall surface 22 of the molding space 21.

In this condition, only the front end portion 31 of the ejection pin 3 extends into the molding space 21 from the inner wall surface 22 thereof. On the other hand, in a demolding operation which is performed to take the molded product "m" out of the molding space 21, the ejection pin 3 is pushed into the molding space 21 to further extend forward from the inner wall surface 22 of the molding space 21. In this embodiment, in view of viscosity and like characteristics of the molten resin, as shown in the front view in FIG. 2, a radius "r" of the semispheric front end portion 31 of the ejection pin 3 is preferably within a range of from 3.00 mm to 7.20 mm. Further, a height "h" of the semispheric front end portion 31 is preferably within a range of from 0.07 mm to 0.17 mm. Incidentally, a term "semispheric" used herein indicates any curved convex surfaces including oval ones, aspheric ones and a like in addition to the semispheric ones themselves.

The ejection pin operating mechanism 4 is used to operate the ejection pin 3, and integrally placed with the mold unit 2a, 2b to serve as a dedicated mechanism for the mold unit 2a, 2b. Consequently, when the mold unit 2a, 2b is replaced with the new or different one, the ejection pin operating mechanism 4 is also replaced together as a set with a new or different one, which makes it possible to eliminate any position adjusting operation of the ejection pin 3.

Figure 4A:
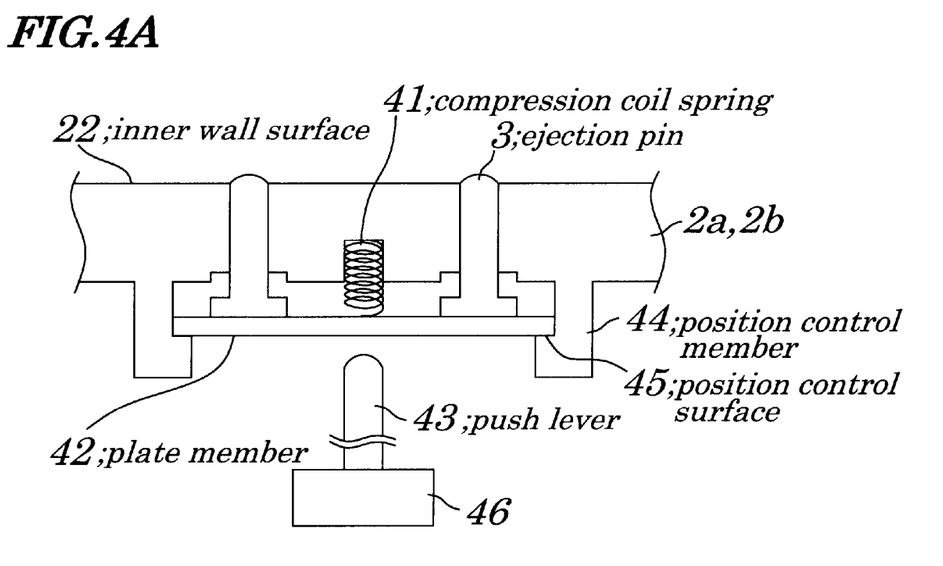
FIG. 4A is a schematic diagram of a lower mold of the mold unit shown in FIG. 3A, illustrating a position of the ejection pin in the molding operation.
Figure 4B:
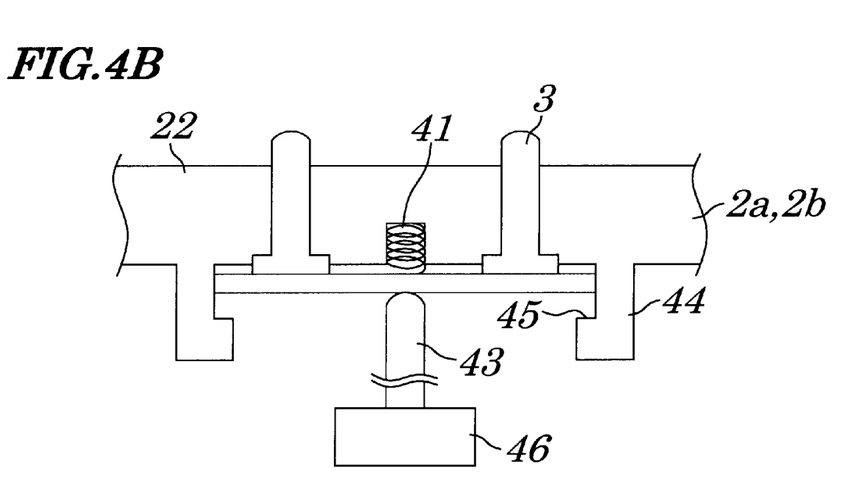
FIG. 4B is a schematic diagram of the lower mold shown in FIG. 4A, illustrating the position of the ejection pin in the demolding operation.

The ejection pin operating mechanism 4 used in this embodiment is shown in FIGS. 4A and 4B. In this ejection pin operating mechanism 4, as is clear from FIG. 4A, a plate member 42 is fixedly mounted on a bottom portion of the ejection pin 3.

In operation, this plate member 42 is moved up and down, so that the ejection pin 3 is adjusted in position relative to the lower mold 2b, whereby the length of the front end portion 31 extending into the molding space 21 from the inner wall surface 22 of the lower mold 2b is controlled. When the plate member 42 is moved downward, a compression coil spring 41 mounted in the mold unit 2a, 2b exerts its resilient force on the plate member 42 to move it downward, as shown in FIG. 4A.

On the other hand, as is clear from FIG. 4B, the plate member 42 is moved upward by a push lever 43 which is moved up and down by power supplied from a motive source 46. This motive source 46 is controlled by the control unit 7 (shown in FIG. 1) in operation.

The plate member 42 is limited in stroke by a position control member 44 which is fixedly mounted in the mold unit 2a, 2b. In other words, in operation, the plate member 42 having moved to its lowermost position under an influence of the resilient force exerted by the compression coil spring 41 abuts on the position control member 44, and thereby being prevented from further moving downward.

More specifically, when the molten resin is injected into the molding space 21, the plate member 42 has its opposite end portions abut on a position control surface 45 of the position control member 44, and thereby being prevented from moving downward beyond its lowermost position.

Figure 5A:
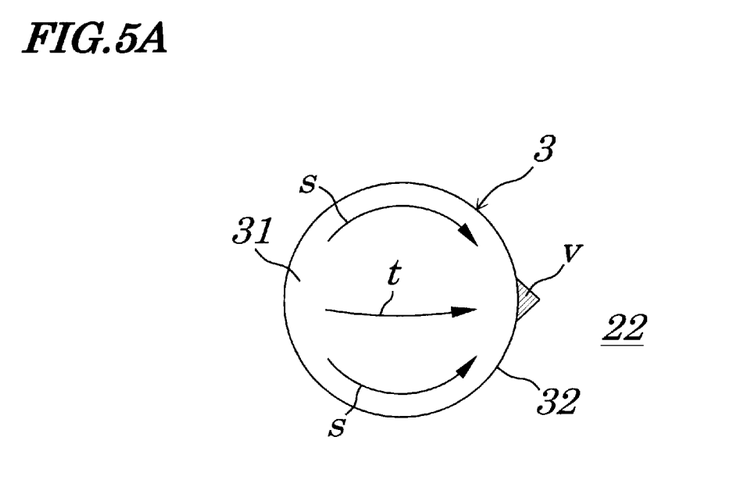
FIG. 5A is the top view of the ejection pin, illustrating a flow of the molten resin in a vicinity of a front end portion of the ejection pin used in the resin-molding apparatus shown in FIG. 1.
Figure 5B:
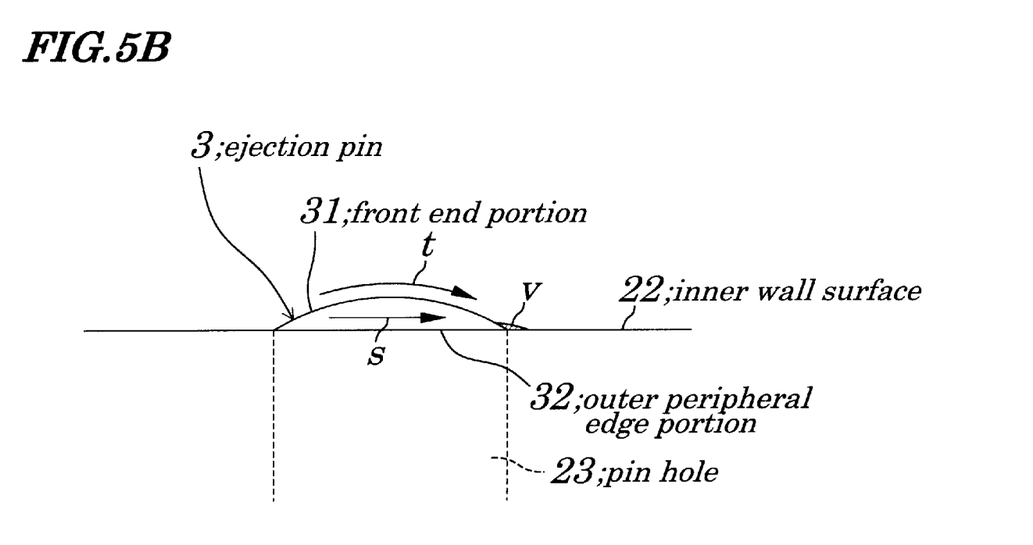
FIG. 5B is a front view of the ejection pin, illustrating the flow of the molten resin in the vicinity of the front end portion of the ejection pin used in the resin-molding apparatus shown in FIG. 1.

In a condition in which the plate member 42 abuts on the position control surface 45, as shown in FIG. 5B, the ejection pin 3 has the outer peripheral edge portion 32 (shown in FIG. 5B) of its front end portion 31 strictly aligned in level with the inner wall surface 22 of the molding space 21.

On the other hand, as shown in FIG. 1, the mold unit operating mechanism 5 is used to operate the lower mold 2b. In this embodiment, the mold unit operating mechanism 5 is provided with a hydraulic mechanism which is operated in accordance with an instruction issued from the control unit 7. The mold unit operating mechanism 5 is further provided with a plurality of the support arms 51. Each of the support arms 51 is connected with the connection portion 25 which is provided in the bottom portion of the lower mold 2b. In operation, the mold unit operating mechanism 5 has the support arms 51 extended and retracted using the hydraulic mechanism, so that the lower mold 2b facing the stationary upper mold 2a is moved up and down relative to the upper mold 2a so as to be brought into contact with and spaced apart from the upper mold 2a.

The resin injection unit 6 heats resin pellets (not shown), which have been supplied separately from outside, and melts them to prepare the molten resin. Thus obtained molten resin is then injected into the molding space 21 through the resin injection opening 24 of the mold unit 2a, 2b. The resin injection unit 6 is controlled in operation according to an instruction issued from the control unit 7.

On the other hand, the control unit 7 is used to control in operation the entire resin-molding apparatus 1, and provided with an electric circuit and a control switch 71 through which the operator controls the resin-molding apparatus 1.

Next, with reference to FIGS. 1, 3A, 3B, 4A, 4B, 5A and 5B, the molding operation performed in the resin-molding apparatus 1 will be described.

Prior to the molding operation, the lower mold 2b is moved downward relative to the upper mold 2a by the mold unit operating mechanism 5 according to an instruction issued from the control unit 7, so that the lower mold 2b is spaced apart from the upper mold 2a. Under such circumstances, an article "p" such as a semiconductor chip or a like to be sealed with the molten resin is placed in the molding space 21 by an operator's hand or any other suitable means such as an automatic handling unit or a like.

Then, both the mold unit operating mechanism 5 and the ejection pin operating mechanism 4 are actuated, so that the lower mold 2b and the ejection pin 3 are held in their respective positions (shown in FIG. 3A) required in the molding operation. In other words, in the molding operation, the article "p" such as the semiconductor chip or the like to be sealed with the resin is sandwiched between the upper mold 2a and the lower mold 2b, and thereby fixedly placed in its predetermined position. In this condition, since the lower mold 2b is brought into direct contact with the upper mold 2a except for an area corresponding to the above sandwiched portion of the article "p", the molding space 21 is completely closed to the outside.

On the other hand, as shown in FIG. 4A, the ejection pin operating mechanism 4 has its push lever 43 moved downward to permit the plate member 42 to abut on the position control surface 45 under the influence of the resilient force exerted by the compression coil spring 41. In other words, as shown in FIG. 5B, the outer peripheral edge portion 32 of the ejection pin 3 is maintained in a position in which this outer peripheral edge portion 32 is strictly aligned in level with the inner wall surface 22 of the molding space 21. In this condition, as is clear from FIG. 5B, only the semispheric front end portion 31 of the ejection pin 3 extends into the molding space 21 from the inner wall surface 22 thereof.

In the molding operation, the resin injection unit 6 is actuated by the control unit 7 so that the resin pellets (not shown) are melted and injected into the molding space 21 through the injection opening 24 (shown in FIG. 1). In this case, since the front end portion 31 of the ejection pin 3 is formed into to the substantially semispheric shape, the molten resin flows in the vicinity of the front end portion 31 of the ejection pin 3 as indicated by curved arrows "s" and"t" which indicate streamlines of the molten resin in the vicinity of the front end portion 31. More specifically, as indicated by the curved arrows "s" and "t" shown in FIGS. 5A and 5B, the molten resin flows along a semispheric surface of the front end portion 31 of the ejection pin 3 to enter a downstream side of the ejection pin 3, and thereby substantially removing any air trap "v" formed in the downstream side of the ejection pin 3.

After completion of an injection operation of the molten resin into the molding space 21, molded resin is cured. After the molded resin is completely cured, the mold unit operating mechanism 5 is actuated by the control unit 7 so that the lower mold 2b is moved downward and spaced apart from the upper mold 2a to perform the demolding operation. At this time, the ejection pin operating mechanism 4 is also actuated to enhance the demolding operation in concert with the mold unit operating mechanism 5.

Figure 3A:
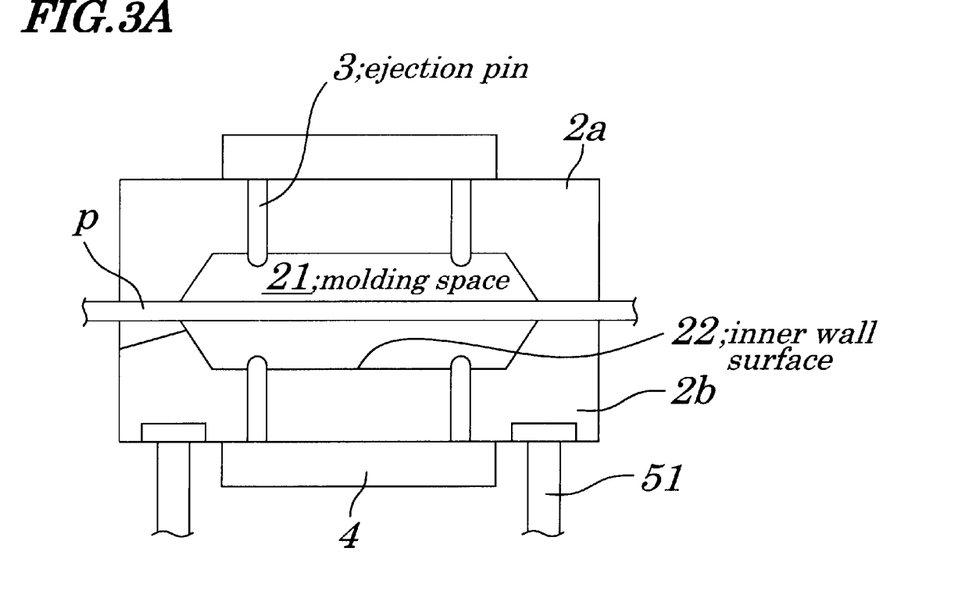
FIG. 3A is a schematic diagram of the resin-molding old unit used in the resin-molding apparatus shown in FIG. 1, illustrating the resin-molding operation of a molten resin.
Figure 3B:
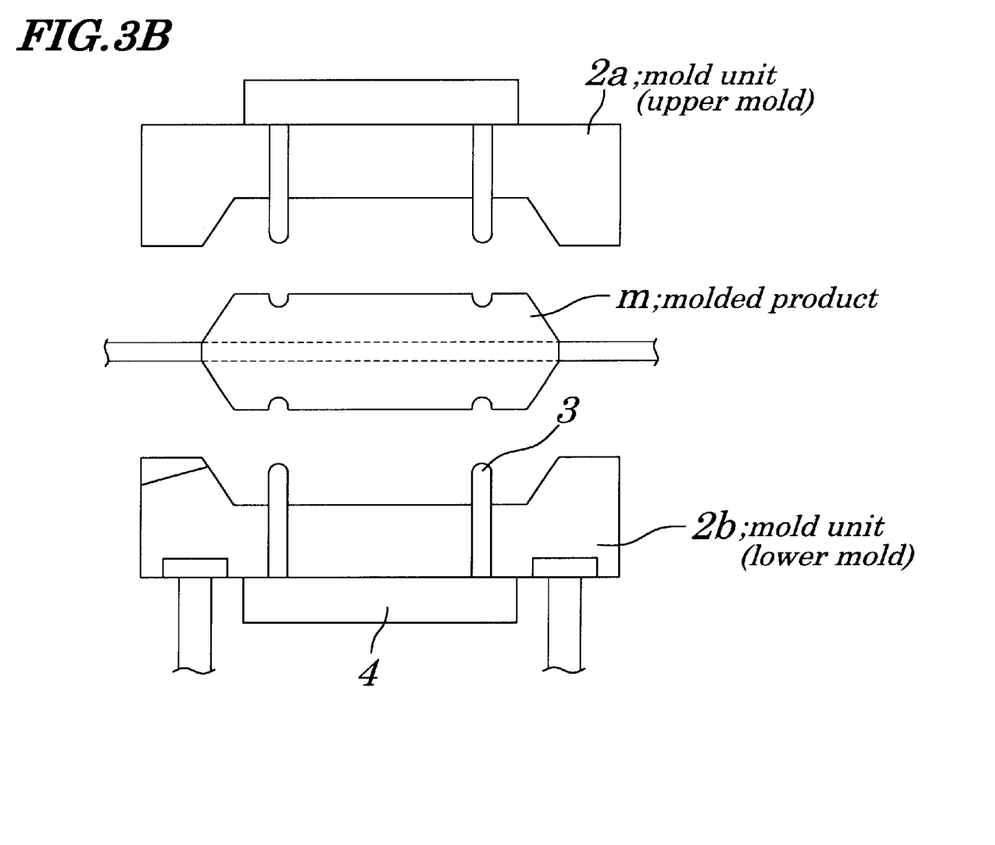
FIG. 3B is a schematic diagram of the resin-molding mold unit used in the resin-molding apparatus shown in FIG. 1, illustrating a demolding operation of a molded product taken out of a mold space.

More specifically, the push lever 43 is moved up toward the plate member 42 by actuating the ejection pin operating mechanism 4. As a result, as is clear from FIG. 4B, the ejection pin 3's front end portion 31 extending into the molding space 21 from the inner wall surface 22 thereof is increased in length. Consequently, the molded product "m" is pushed out of the molding space 21 by the ejection pins 3, so that the demolding operation of the molded product "m" is performed, as shown in FIG. 3B.

As described above, in the resin-molding apparatus 1 of this embodiment, there is substantially no danger that the air trap "v" is formed in the vicinity of the ejection pin 3. Consequently, the molded product "m" produced by the resin-molding apparatus 1 is improved in appearance and sealing properties since any void is removed from a surface of this product "m".

Figure 6A:
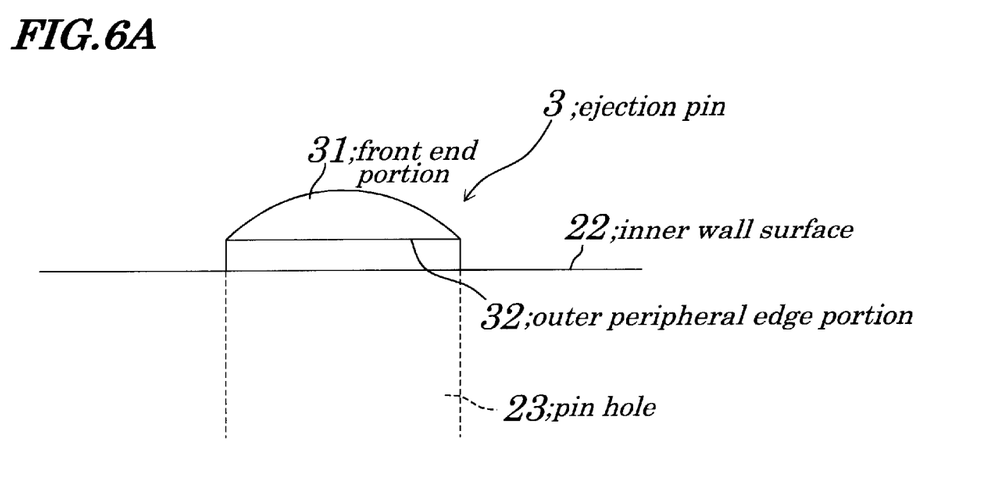
FIG. 6A is a front view of the ejection pin shown in FIG. 5B, illustrating the ejection pin excessively projected from an inner wall surface of the lower mold.
Figure 6B:
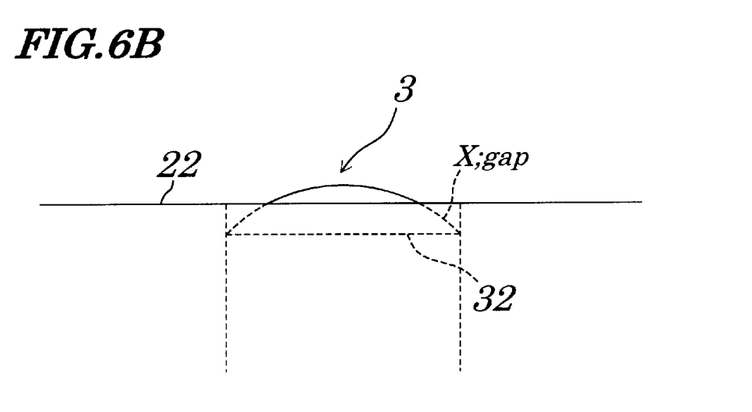
FIG. 6B is a front view of the ejection pin shown in FIG. 6A, illustrating the ejection pin excessively retracted from the inner wall surface of the lower mold.

This is a remarkable effect obtained in the resin-molding apparatus 1 without sacrificing the molded product "m" in productive efficiency. This remarkable effect is further ensured by integrally forming the mold unit 2a, 2b with mechanisms including compression coil spring 41 and position control member 44. The are used to control in position the ejection pin 3, and constructed of the compression coil spring 41, the position control member 44 and like components. In other words, as is clear from FIGS. 1 and 5B, the above-mentioned remarkable effect of the resin-molding apparatus 1 is derived from the semispheric top surface of the front end portion 31 of the ejection pin 3, which top surface is exposed to the molding space 21 in a condition in which the outer peripheral edge portion 32 of the ejection pin 3 is strictly aligned in level with the inner wall surface 22 of the molding space 21. When the ejection pin 3 is excessively extended into the molding space 21 as shown in FIG. 6A, it is not possible to remove the air trap "v" (shown in FIG. 5B) formed in the downstream side of the ejection pin 3. In contrast with this, when the ejection pin 3 is excessively retracted into the pin hole 23 to form a gap "x" therebetween as shown in FIG. 6B, the molded product "m" suffers from a fin which is produced by filling the gap "x" with the molten resin in the molding operation. Further, since the fin thus produced in the molding operation is thick in its root portion, it is difficult to remove this fin from the molded product "m". Still further, the fin is very sharp in its front end, and therefore dangerous to the operator of the resin-molding apparatus 1. As is clear from the above description, the resin-molding apparatus 1 requires a strict position adjusting operation of the ejection pin 3. However, this adjusting operation is cumbersome and time consuming. In order to solve this problem, the resin-molding apparatus 1 of the present invention uses a mold assembly in which the ejection pin operating mechanism 4, particularly, its mechanism portion for controlling in position the ejection pin 3 in the molding operation is integrally formed with the mold unit 2a, 2b. Consequently, in the individual mold assembly of the resin-molding apparatus 1, since the mold unit 2a, 2b is provided with its dedicated mechanism for controlling in position the ejection pin 3 in the molding operation, any position adjusting operation of the ejection pin 3 is not required in keeping the ejection pin 3 in its optimum position even when the mold assembly is replaced with a new one in the molding apparatus 1. Consequently, by using the mold assembly constructed of the ejection pin operating mechanism 4 integrally formed with the mold unit 2a, 2b, it is possible for the resin-molding apparatus 1 of the present invention to improve the molded product "m" in productive efficiency. The resin-molding apparatus 1 is also adapted for a FMS (Flexible Manufacturing System). Incidentally, it is also possible to form the ejection pin operating ejection pin operating mechanism 4 independently of the mold unit 2a, 2b. In this case, the thus independently formed mechanism 4 is used with each of a plurality of the mold units 2a, 2b, which requires the position adjusting operation of the ejection pin 3 each time the mold unit 2a, 2b is replaced with a new or different one, and therefore makes the productive efficiency of the molded product "m" poor.

Although the embodiment of the present invention has been described above in detail with reference to the drawings, the present invention is not limited to this embodiment. Any changes and modifications made within the spirit of the present invention belong to the present invention.

For example, in the above embodiment, though the front end portion 31 of the ejection pin 3 does not bear any mark, any characters, or a like in its front end portion 31, it is also possible for the front end portion 31 to bear at least one of carved and/or embossed marks, characters or a like, which makes it possible for the molded product "m" to bear at least one of embossed and/or carved product marks, direction marks of the product, specifications of the product, mold unit's serial numbers, or like carved and/or embossed marks.

In the above embodiment, though the front end portion 31 of the ejection pin 3 is formed into the semispheric shape, it is also possible for the front end portion 31 to assume any other suitable shape, provided that the suitable shape does not produce any air trap "v" in the downstream side of the ejection pin 3.

Further, though the injection opening 24 is formed in the lower mold 2b, it is also possible to form the injection opening 24 in the upper mold 2a.

Still further, though the mold unit operating mechanism 5 is designed to operate only the lower mold 2b, it is also possible to design the mold unit operating mechanism 5 in a manner such that the mold unit operating mechanism 5 operates both the upper mold 2a and the lower mold 2b.

In addition, though the pin hole 23 for receiving the ejection pin 3 therein is constructed of the through-hole formed in the mold unit 2a, 2b, the pin hole 23 may be constructed of a blind hole, provided that the ejection pin operating mechanism 4 is modified to operate the ejection pin 3 in the blind hole.

In the above embodiment, the entire ejection pin operating mechanism 4 is integrally formed with the mold unit 2a, 2b. However, as for components such as the motive source 46 and a like other than the position control mechanism for controlling in position the ejection pin 3 in the molding operation, it is also possible to form these components independently of the position control mechanism, wherein any position adjusting operation of the ejection pin 3 is not required even when the mold unit 2a, 2b is replaced with the new or different one.

Although the ejection pin operating mechanism 4 is provided with its own motive source 46, it is not necessarily required to provide the motive source 46 in each of the ejection pin operating mechanisms 4. In other words, it is also possible to power the ejection pin operating mechanism 4 by any other suitable drives, for example such as one for the resin injection unit 6 in a manner such that the push lever 43 is powered by this drive.

As described above, both the mold unit 2a, 2b and the resin-molding apparatus 1 of the present invention is capable of improving the molded product "m" in appearance and sealing properties without sacrificing the productive efficiency of the molded product "m".

It is thus apparent that the present invention is not limited to the above embodiments but may be changed and modified without departing from the scope and spirit of the invention.

Finally, the present application claims the Convention Priority based on Japanese Patent Application No. Hei 11-150664 filed on May 28, 1999, which is herein incorporated by reference.

What is claimed is:

1. A resin-molding mold unit comprising:
   a resin-molding mold member provided with a cavity having a predetermined shape, wherein said cavity is defined by an inner wall surface of said resin-molding mold member, and said inner wall surface is provided with a hole;
   a movable member which is movably mounted in said hole of said resin-molding mold member and a front end portion of said moveable portion is formed into a semispheric shape; and
   an ejection member coupled to said moveable member, wherein said ejection member moves said moveable member to a first position when injecting a resin material into said cavity and wherein said ejection member moves said moveable member to a second position to eject said resin material from said cavity.

2. The resin-molding mold unit according to claim 1, wherein said resin-molding mold member is further provided with an injection passage through which a molten resin is injected into said cavity of said resin-molding mold member.

3. The resin-molding mold unit according to claim 1, wherein said resin-molding mold member is integrally coupled to said ejection member to position said movable member in a manner such that said movable member has an outer peripheral edge portion of its semispheric front end portion aligned in level with said inner wall surface which defines said cavity of said resin-molding mold member.

4. A resin-molding apparatus for molding a molten resin into a predetermined shape, comprising:

a resin-molding mold unit comprising a first resin-molding mold member and a movable member, wherein said first resin-molding mold member is provided with a first cavity assuming a predetermined shape, wherein said first cavity is defined by an inner wall surface of said first resin-molding mold member, and said inner wall surface is provided with a hole, wherein said movable member is movably mounted in said hole of said first resin-molding mold member and has its front end portion formed into a semispheric shape, wherein said first resin-molding mold member is integrally provided with a position control mechanism for controlling in position said movable member in a manner such that said movable member has an outer peripheral edge portion of its semispheric front end portion aligned in level with said inner wall surface which defines said first cavity of said first resin-molding mold member;

a second resin-molding mold member provided with a second cavity which cooperates with said first cavity of said first resin-molding mold member to form a molding space into which said molten resin is injected and formed into a molded product; and a movable member operating mechanism for operating said movable member in a manner such that: when said molten resin is injected into said molding space, said movable member is held in a position established by said position control mechanism; and, when said molded product is taken out of said molding space, said movable member is pushed forward to extend into said molding space to enhance demolding of said molded product.

5. The resin-molding apparatus according to claim 4, further comprising a mold unit operating mechanism for operating at least one of said first and said second resin-molding mold member so as to have said one brought into contact with and spaced apart from the other of said first resin-molding mold member and said second resin-molding mold member.

6. The resin-molding apparatus according to claim 5, still further comprising an injection means for injecting said molten resin into said molding space, wherein said molding space is formed by both said first resin-molding mold member and said second resin-molding mold member.

* * * * *